United States Patent
Levesque et al.

(10) Patent No.: US 8,704,523 B2
(45) Date of Patent: Apr. 22, 2014

(54) MEASURING CASING ATTENUATION COEFFICIENT FOR ELECTRO-MAGNETICS MEASUREMENTS

(75) Inventors: Cyrille Levesque, San Francisco, CA (US); David Alumbaugh, Berkeley, CA (US); Richard Rosthal, Richmond, CA (US); Hong Zhang, El Sobrante, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 336 days.

(21) Appl. No.: 12/416,411

(22) Filed: Apr. 1, 2009

(65) Prior Publication Data

US 2009/0302852 A1     Dec. 10, 2009

Related U.S. Application Data

(60) Provisional application No. 61/059,123, filed on Jun. 5, 2008.

(51) Int. Cl.
*G01V 3/10* (2006.01)
(52) U.S. Cl.
USPC ............. 324/339; 324/338; 324/347; 175/40; 166/302; 166/250.03
(58) Field of Classification Search
USPC ........................................................ 324/339
See application file for complete search history.

(56) References Cited

U.S. PATENT DOCUMENTS

| | | | |
|---|---|---|---|
| 5,260,661 A | 11/1993 | Vail, III | |
| 5,283,520 A | 2/1994 | Martin et al. | |
| 6,294,917 B1 * | 9/2001 | Nichols | 324/339 |
| 6,393,363 B1 | 5/2002 | Wilt et al. | |
| 6,534,986 B2 | 3/2003 | Nichols | |
| 7,030,617 B2 * | 4/2006 | Conti | 324/339 |
| 7,481,274 B2 * | 1/2009 | Vinegar et al. | 166/302 |
| 2002/0105333 A1 | 8/2002 | Amini | |
| 2005/0156602 A1 | 7/2005 | Conti | |
| 2006/0054354 A1 * | 3/2006 | Orban | 175/40 |
| 2009/0005992 A1 | 1/2009 | Alumbaugh et al. | |
| 2009/0151935 A1 * | 6/2009 | Lovell et al. | 166/250.03 |

FOREIGN PATENT DOCUMENTS

| | | |
|---|---|---|
| WO | WO2006114208 | 11/2006 |
| WO | WO2007065667 | 6/2007 |

* cited by examiner

*Primary Examiner* — Arleen M Vazquez
*Assistant Examiner* — Son Le
(74) *Attorney, Agent, or Firm* — Jeremy Berman

(57) ABSTRACT

Methods and related systems are described for making an electromagnetic induction survey of a formation surrounding a cased section of a borehole. An electromagnetic transmitter and/or receiver are deployed into the cased section of the borehole. One or more additional devices are used to measure the properties of a conductive casing relating to conductivity, thickness and magnetic permeability. A casing coefficient is then calculated that can then be used for the processing of the deep-sensing induction measurements.

26 Claims, 3 Drawing Sheets

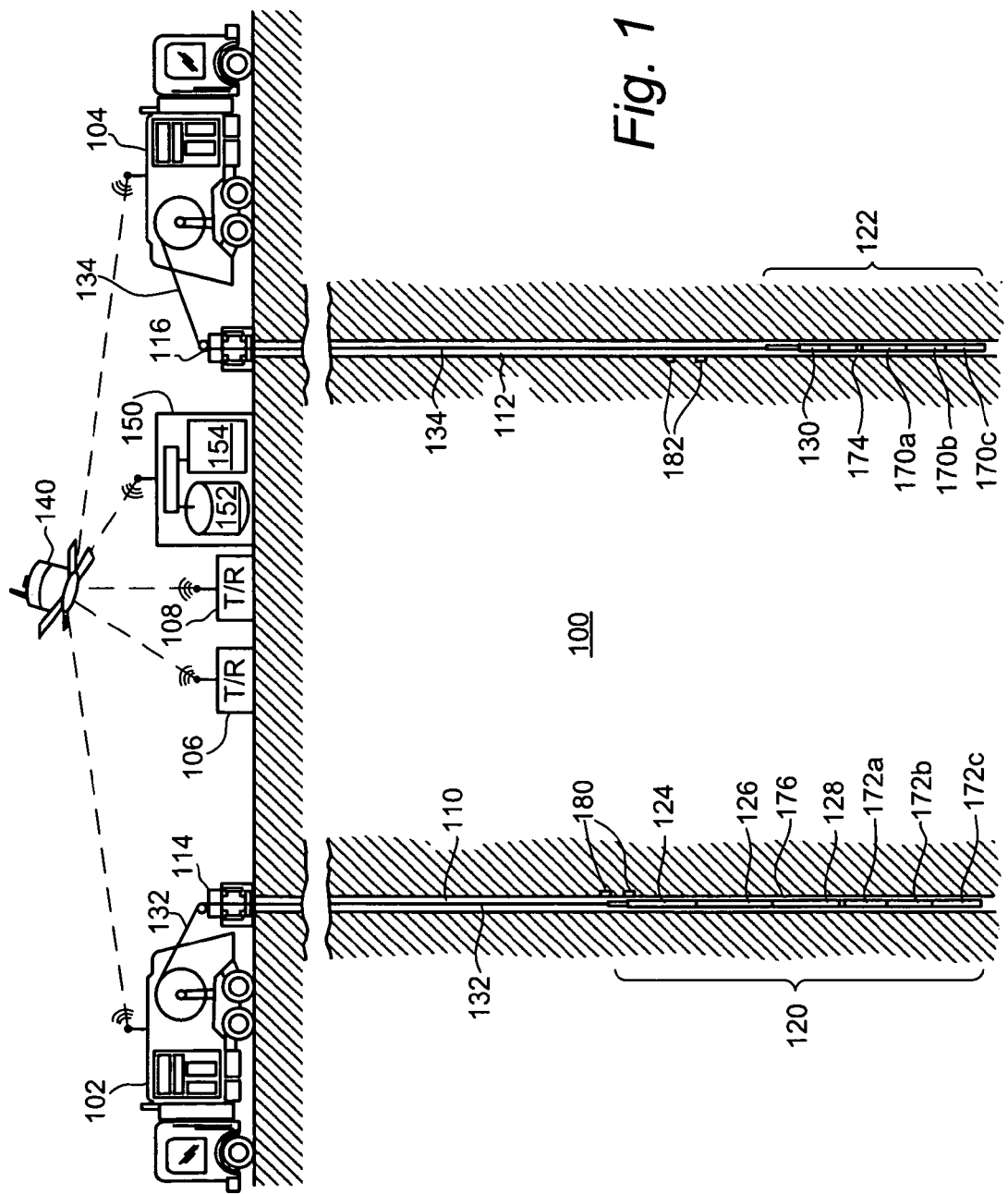

MEASURING CASING ATTENUATION COEFFICIENT FOR ELECTRO-MAGNETICS MEASUREMENTS

CROSS-REFERENCE TO RELATED APPLICATIONS

This application claims the benefit of U.S. Provisional Application No. 61/059,123, entitled "METHOD FOR MEASURING NON-MAGNETIC CASING ATTENUATION COEFFICIENT FOR ELECTROMAGNETIC MEASUREMENTS," filed Jun. 5, 2008, the disclosure of which is hereby incorporated herein by reference.

BACKGROUND OF THE INVENTION

1. Field of the Invention

This patent specification relates to electromagnetic measurements made in connection with boreholes. More particularly, this patent specification relates to methods and systems for correcting for, or determining attenuation due to, a conductive casing of a borehole used in making electromagnetic measurements.

2. Background of the Invention

Electromagnetic measurements are widely used within the oilfield industry to locate fluids inside the reservoir. Connate water is typically much more conductive than the hydrocarbon, and therefore measuring the resistivity of the formation allows clear distinction between the two fluids.

Conductivity measurements can be performed by inductive means. A number of induction tools have been developed for single well applications but other deployments have been proposed, such as cross-well EM, surface to borehole, borehole to surface and long offset single well, as a means to increase the depth of investigation around the borehole. A crosswell system is composed of a magnetic transmitter, which is located in one well, and some receivers located in a separate well. A surface to borehole system is composed of an array of transmitters at the surface and some receivers downhole, and a borehole to surface system is the opposite configuration of an array of transmitters downhole with receivers at the surface. A single well tool is composed of one or multiple transmitters located in the same well as one or multiple receivers.

Induction methods employing these systems do work well in open or fiberglass-cased wells, but when the well is steel cased, interpretation of the data becomes more problematic. This is due to the fact that the metal casing attenuates the signal and the casing imprint is not uniform as the casing properties (magnetic permeability, conductivity and thickness) are heterogeneous.

Some difficulties can be overcome when a non-magnetic steel casing is used (Chromium alloy for instance) but casing attenuation still needs to be accounted for in interpretation of the data.

A description of prior art regarding other techniques of removing the effects of conductive liners, or casing, in borehole EM can be found in U.S. Pat. No. 6,294,917 (hereinafter "the '917 Patent"), U.S. Pat. No. 6,393,363 (hereinafter "the '363 Patent," and U.S. Patent Application Publication No. US2009/0005992A1 (hereinafter "the '992 Patent Application," each of which is incorporated herein by reference. Some of the methods described rely on various ratios to cancel out the casing factor. Some of the methods rely on numerical modeling requiring a priori knowledge of the geologic structure surrounding the wells.

Thus it is desirable to provide methods for removing the effects of conductive liners that do not require a priori knowledge of the formation while not significantly degrading the sensitivity of the deep-sensing measurement to the formation near the wellbore.

SUMMARY OF THE INVENTION

According to embodiments, a method is provided for making an electromagnetic survey of a formation surrounding a borehole having a casing. The method includes receiving electromagnetic survey measurements of the formation, the measurements being made with an electromagnetic transducer deployed into a section of the borehole that is cased with a conductive casing. Depth correlated casing property data is received that represents one or more properties relating to the casing for the section of the borehole. The casing property data is measured using one or more other transducers. Attenuation in the electromagnetic survey measurements due to the conductive casing is compensated for. The compensation based at least in part on the received casing property data. As used here the term "transducer" means any device that converts one type of energy or physical attribute to another for various purposes including measurement or information transfer. The depth correlated casing property data preferably allows for a derivation of casing thickness, casing conductivity, and/or relative magnetic permeability. The casing property data is preferably measured using one or more downhole tools selected such as cased hole formation resistivity tools, and electromagnetic imaging tools. As used herein, the term "transducer" thus includes sensors and/or receivers as well as transmitters. As used herein the term "attenuation" includes both amplitude attenuation and/or phase shift.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 is a schematic showing an electromagnetic induction survey system in accordance with embodiments of the invention;

DETAILED DESCRIPTION OF THE PREFERRED EMBODIMENTS

Figure 2B:
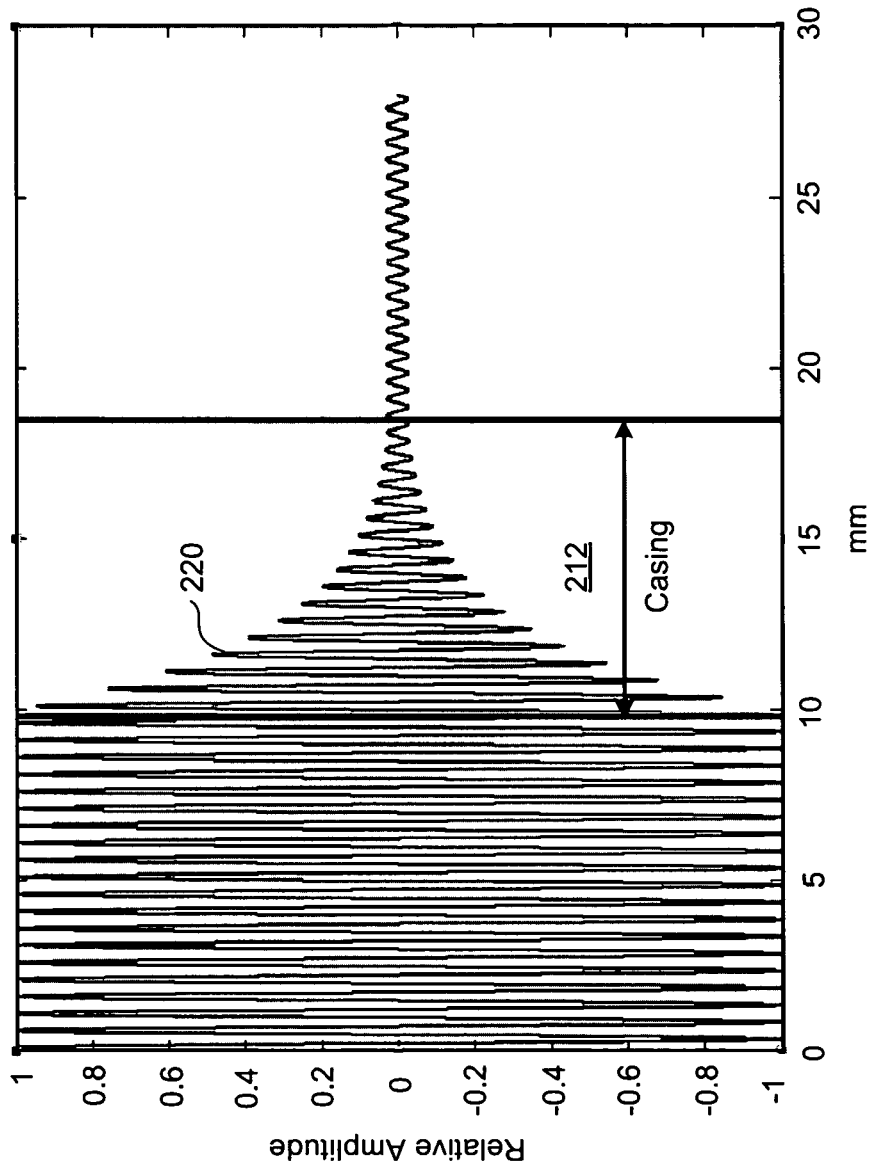
FIGS. 2a-b illustrate the effect of a steel casing on the amplitude of a sine wave.

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicate like elements.

FIG. 1 is a schematic showing an electromagnetic induction survey system in accordance with embodiments of the invention. Boreholes 110 and 112 are in subterranean formation 100. Wireline toolstring 120 is deployed in borehole 110 from wireline truck 102 using cable 132 via wellhead 114. Similarly, wireline toolstring 122 is deployed in borehole 112 from wireline truck 104 using cable 134 via wellhead 116. Trucks 102 and 104 communicate with each other and/or other surface components and systems via communication with satellite 140 or other known wireless or wired means. Toolstring 120 includes several components, such as electromagnetic receivers 124, 126 and 128, as well as one or more additional casing analysis tools 172a, 172b and 172c. Toolstring 122 includes electromagnetic transmitter 130 as well as one or more casing analysis tools 170a, 170b, and 17c. As will be described in further detail below, the casing analysis tools 170a-c and 172a-c, can be, for example, tools such as Schlumberger's Cased Hole Formation Resistivity (CHFR) tool, Schlumberger's USI UltraSonic Imager Tool (USIT), and/or Schlumberger's Electro magnetic Imager Tool (EMIT). One or more of these tools can provide depth-correlated measurements which can be easily used to yield casing thickness, casing conductivity and/or relative magnetic permeability.

Surface stations TSS (Transmitter Surface Station) and RSS (Receiver Surface Station) inside Trucks 102 and 104 communicate with each other and/or other surface components and systems via communication with satellite 140 or other known wireless or wired means. According to some embodiments, surface transmitters and/or receivers 106 and 108 are used instead of, or in addition to either of the downhole toolstrings 120 and 122 when performing surface-to-borehole or borehole-to-surface electromagnetic induction surveys. According to some embodiments, processing system 150 is connected either to the TSS and/or RSS, and is used to process the measured data. System 150 includes one or more processors 154 and a storage system 152 that can include various types of storage including volatile memory such as primary random access memory, and non-volatile memory such as read-only memory, flash memory, magnetic computer storage devices such as hard disks, floppy disks, and magnetic tape, and optical discs such as CD ROMS, DVD ROMS. According to some embodiments, a processing system such as processing system 150 is incorporated into the TSS and/or RSS. It is also recognized that such communication is not absolutely necessary. So long as the TSS and RSS can be synchronized by reference to the same time standard (as for instance the GPS satellite system), data can be stored for later processing.

Deep sensing induction tools such as transmitter 130 on toolstring 122 broadcast a magnetic field into a conductive media including formation 100 and measure the attenuation and phase shift of the magnetic field at a receiver coil such as receivers 124, 126 and 128 in toolstring 120 located at some distance away from the transmitter 130. The positions of the transmitters and receivers are then changed throughout a whole reservoir region within formation 100, as well as above and below the reservoir, to provide a set of magnetic field measurements, including amplitude and phase, that have sensitivity to various spatial positions within the reservoir. The data are then processed in processing system 150 (or in the TSS and/or RSS) and inverted to provide a resistivity distribution around the borehole or between the boreholes 110 and 112. When the transmitter 130 or the receivers 124, 126 and 128 are inside a conductive casing, a correction should to be applied to remove the casing effect such that the data is more akin to open hole data. Note that according to these embodiments, the measurements from casing analysis tools 170a-c and/or 172a-c are made with transducers that are separate from the electromagnetic transducers (such as transmitter 130 and receivers 124, 126 and 128) that are used to make the electromagnetic induction measurements of the formation.

While the use of two wireline units is primarily shown in FIG. 1, according other embodiments the techniques described herein are practiced using permanent transmitters such as transmitters 182 and/or permanent receivers such as receivers 180 in one or both wells or using sensors deployed while drilling. For further detail on permanent electromagnetic measurement systems, see U.S. Pat. No. 6,534,986 which is incorporated herein by reference. According to yet other embodiments, the transmitter and receiver can be located in a single well. For example, receiver 124 is instead a transmitter, while receivers 126 and 128 remain receivers. For further detail on single-well electromagnetic measurement systems see application Ser. No. 61/119,282, filed Dec. 2, 2008, which is incorporated herein by reference.

In a uniform media, the attenuation and the phase shift of a signal sensed at a receiver is related to the skin depth, a quantity that is equal to:

$$\delta = \sqrt{\frac{2}{\mu \sigma \omega}}$$

in meters
where $\mu = \mu_0 \cdot \mu_r$;
$\sigma$=formation conductivity in S/m; and
$\omega = 2\pi f$ with f being the frequency of the magnetic field.

When the magnetic field diffuses into the formation at a distance r from the source, the signal amplitude reduces proportionally to $e^{-r/\delta}$, and the phase shift is proportional to $r/\delta$.

So, for every skin depth, the attenuation is 1/e or 63%, and the phase 'rotates' by one radian or approximately 57 degrees.

Consider a steel casing such as steel casing 174 surrounding transmitter 130 or steel casing 176 surrounding receiver coils 124, 126 and 128 as shown in FIG. 1. Because the steel casing is on the order of one million times more conductive than a typical earth formation, an effect can be expected as has just been described. However, this effect may be balanced by the small volume of steel.

For a typical 7" casing with a weight of 23 lb/ft, its thickness is approximately 8.05 mm. Assuming $\mu_r = 100$, $\sigma = 5e6$ S/m, and f=100 Hz, $\delta = 2.25$ mm. The attenuation of the sine wave will therefore be approximately 97.5%. Note that this calculation only provides the order of magnitude of the effect. In each particular application, the details of the construction of the sensor and its interaction with the casing should be considered. In many casing situations, the casing properties vary with depth and thus this attenuation will not remain constant. In addition we will need to measure the casing thickness T, the casing conductivity σ and the magnetic permeability $\mu_r$ to compute T/δ at each depth. This variation with depth is due to the fact that the thickness can vary due to corrosion, and the relative magnetic permeability will vary not only from joint to joint, but also within a given casing segment.

According to embodiments, one or more separate tools, such as Schlumberger's Cased Hole Formation Resistivity (CHFR) tool, Schlumberger's USI UltraSonic Imager Tool (USIT), and/or Schlumberger's Electro magnetic Imager Tool (EMIT), which correspond to tools 170a-c and/or 172a-c, are used to make separate measurements such that casing parameters such as casing thickness, casing conductivity and/or relative magnetic permeability can be derived.

In particular the EMIT tool can be used to yield depth correlated measurements of: (1) the ratio of casing thickness over skindepth; and (2) magnetic permeability over casing conductivity (μ/σ). Further details of tools such as EMIT are described in International Published Patent Applications Nos. WO 2006/114208 A1 and WO 2007/065667 A1, each of which is incorporated herein by reference. Note that although casing analysis tools 170a-c and 172a-c are shown as part of the same tool string as the transmitters and receivers in FIG. 1, in practice the separate measurement using such tools can occur using one or more separate toolstrings, each of which can be made at a different time from the electromagnetic induction formation survey.

The USIT tool, can be used to yield depth correlated casing thickness. The CHFR tool can be used yield a depth correlated product of casing thickness and casing conductivity (T*σ).

Thus according to embodiments, different combinations of measurements from tools such as the EMIT, USIT and/or CHFR to independently derive casing thickness, casing conductivity, and/or relative magnetic permeability. Assuming all three of these parameters as a function of depth are known, it is possible to compute the "casing factor" all along the pipe.

In some cases, chromium steel casing is installed in the section of interest of the borehole. Since chromium casing is substantially non-magnetic (that is, it has a relative magnetic permeability of 1), only two casing properties require resolution from the two equations above. For example, a tool such as USIT can yield depth correlated casing thickness (T), and a tool such as CHFR can a yield depth correlated product of casing thickness and casing conductivity (T*σ). Thus, with both the T and T*σ measured and magnetic permeability (μ) known due to the chromium casing, all three casing parameters (T, σ, μ) are known or easily derived, and then employed to directly compute the casing attenuation and/or phase corrections.

In another example, a combination of USIT (yielding T) and EMIT (yielding μ/σ) can be used with a non-magnetic (μ=1) conductive casing such as chromium casing to easily derive all three casing parameters (T, σ, μ).

In the case of a magnetic conductive casing, such as ordinary steel casing a combination of measurements can also be used to easily derive all three casing parameters (T, σ, μ). For example, the USIT provides depth correlated casing thickness (T), the CHFR provides the depth correlated product of casing thickness and casing conductivity (T*σ) and the EMIT provides depth correlated ratios for both casing thickness over skindepth, and magnetic permeability over casing conductivity (μ/σ). Using all three measurements tools, all three casing parameters (T, σ, μ) for magnetic conductive casing (i.e. non-chromium metallic casings such as common steel casings) can be determined.

Thus, by including data from separate measurement with tools such as the CHFR, USIT and EMIT tools, the techniques described herein can be easily applied derive the casing attenuation factor for any conductive casing, magnetic and non-magnetic.

Figure 2A:

FIGS. 2a-b illustrate the effect of a steel casing on the amplitude of a sine wave. FIG. 2a shows a transmitter 210 inside a steel casing 212. FIG. 2b is a plot showing the amplitude response curve 220 after crossing 8 mm of steel casing 212 at 1000 Hz. The steel casing 212 causes a reduction in the amplitude of the signal and a shift in the phase. The transmitted moment becomes:

$$M_{outcasing} = M_{incasing} * Csg\_\text{factor where}$$
$$Csg\_\text{factor} = Ae^{i\phi}$$

$A$=Attenuation $e^{i\phi}$=Phase_shift

Figure 3:
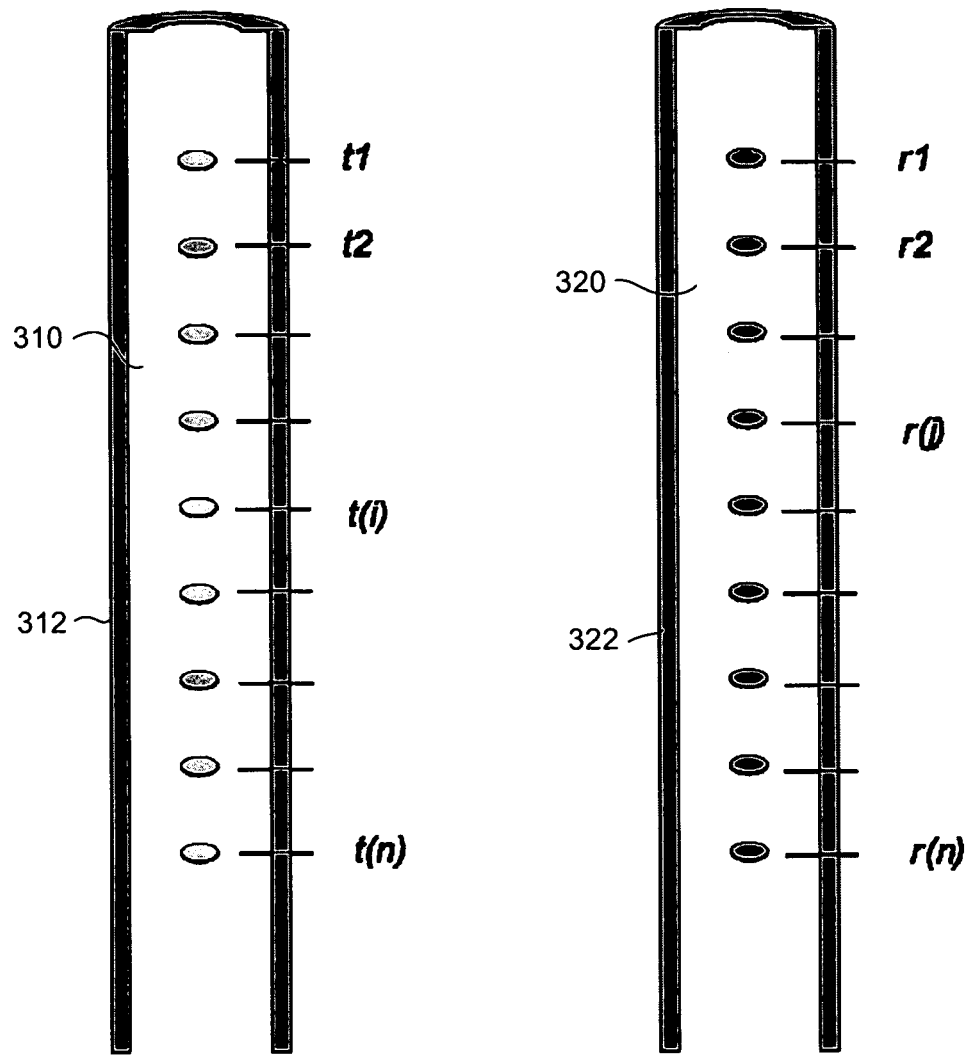
FIG. 3 illustrates an example of a cross-well electromagnetic induction survey with n transmitter stations and n receiver stations, according to embodiments of the invention.

FIG. 3 illustrates an example of a cross-well electromagnetic induction survey with n transmitter stations and n receiver stations, according to embodiments of the invention. Borehole 310 with conductive non-magnetic casing 312 includes transmitter stations t1, t2 ... t(i), ... t(n) as shown. Similarly, borehole 320 with conductive non-magnetic casing 322 includes receiver stations r1, r2, ... r(j), ... r(n). Using a tool such as Schlumberger's EMIT tool, as described above, separate measurements of casing thickness and electrical conductivity are made. Combined with the nominal casing diameter from well completion data, numerical modeling codes can be used to compute for both casings 312 and 322 and at every station a complex casing factor such that transmitter and receiver stations become:

$$t\_\text{corrected}(i) = t(i)/Casing\_factor\_1(i)$$

$$r\_\text{corrected}(j) = r(j)/Casing\_factor\_2(j)$$

Electromagnetic modeling code such as finite element and/or finite difference analysis software can be used. Examples of commercially available numerical modeling software packages that are suitable for generating the relationships include: MagNet finite element analysis simulation software from Infolytica Corporation, and Comsol Multiphysics® software from Comsol AB.

Once these corrections are applied, we have removed the casing factor and the new casing corrected data can be used in the processing workflow in a manner that is similar to open hole data.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein;

rather, the present invention extends to all functionally equivalent structures, methods and uses, such as are within the scope of the appended claims.

What is claimed is:

1. A method for making an electromagnetic survey of a formation surrounding a borehole having a casing comprising:
   deploying an electromagnetic transducer into a section of the borehole that is cased with a conductive casing;
   deploying a casing property analysis tool into the section of the borehole, the casing property analysis tool comprising at least one other transducer;
   making electromagnetic survey measurements of the formation with the electromagnetic transducer;
   making a plurality of measurements of casing property data with the casing property analysis tool at a plurality of depths in the borehole, the casing property data representing one or more properties relating to the casing for the section of the borehole;
   correlating each measurement of casing property data according to a depth at which that measurement was taken;
   directly calculating a casing factor based on the depth correlated casing property data;
   compensating for attenuation in the electromagnetic survey measurements with the directly calculated casing factor; and
   deriving, based on the depth correlated casing property data, one or more casing parameters selected from the group consisting of casing thickness, casing conductivity, and relative magnetic permeability, wherein the deriving is performed independent of reference to the electromagnetic survey measurements;
   wherein at least one of the other transducers using to measure the depth correlated casing property data is deployed at a different time than said electromagnetic transducer into the section of the borehole.

2. A method according to claim 1, wherein the one or more properties relating to casing relate to casing parameters selected from the group consisting of: casing thickness, casing conductivity, and relative magnetic permeability.

3. A method according to claim 1, wherein compensating comprises calculating a casing attenuation factor based at least in part on a derivation of casing thickness and casing conductivity.

4. A method according to claim 3, wherein calculating the casing attenuation factor is based at least in part on a derivation of casing thickness, casing conductivity and relative magnetic permeability.

5. A method according to claim 1, wherein the depth correlated casing property data is measured using one or more downhole tools selected from the group consisting of: ultrasonic imaging tools, cased hole formation resistivity tools, and electromagnetic imaging tools.

6. A method according to claim 1, wherein the section of the borehole is cased with a non-magnetic casing.

7. A method according to claim 6, wherein the non-magnetic cased section of the borehole is cased with non-magnetic chromium steel.

8. A method according to claim 1, wherein at least one of the other transducers using to measure the depth correlated casing property data is deployed concurrently with said electromagnetic transducer into the section of the borehole.

9. A method according to claim 1, further comprising performing an inversion based on the electromagnetic survey measurements, the inversion taking into account the compensation for attenuation due to the conductive casing.

10. A method according to claim 1 further comprising deploying a second electromagnetic transducer into a section of a second borehole, wherein the electromagnetic survey measurements are made by transmitting and receiving between the boreholes using the transducers.

11. A method according to claim 1 further comprising a deploying a second electromagnetic transducer on the surface, wherein the electromagnetic survey measurements are made by transmitting and receiving between surface and the borehole using the transducers.

12. A method according to claim 1 further comprising deploying a second electromagnetic transducer into the section of the borehole, wherein the electromagnetic survey measurements are made by transmitting and receiving between the electromagnetic transducer and second electromagnetic transducer in the section of the borehole.

13. A method according to claim 1 wherein the electromagnetic transducer is permanently or semi-permanently installed in the section of the borehole.

14. A system for making electromagnetic survey measurements of a formation surrounding a borehole having a casing comprising:
    an electromagnetic transducer deployable into a section of the borehole that is cased with a conductive casing and configured to make electromagnetic survey measurements;
    a casing property analysis tool deployable into the section of the borehole and configured to make a plurality of measurements of casing property data at a plurality of depths in the borehole, the casing property analysis tool comprising at least one other transducer; and
    a processing system configured and arranged to compensate for attenuation of the electromagnetic survey measurements due to the conductive casing, the processing system configured to
    receive casing property data correlated according to a depth at which the data was taken, the casing property data representing one or more properties relating to the casing for the section of the borehole measured using the casing property analysis tool and directly calculate a casing factor based on the depth correlated casing property data,
    compensate for attenuation of the electromagnetic survey measurements with the directly calculated casing factor,
    derive, based on the depth correlated casing property data, one or more casing parameters selected from the group consisting of casing thickness, casing conductivity, and relative magnetic permeability, wherein the deriving is performed independent of reference to the electromagnetic survey measurements, wherein at least one of the other transducers using to measure the depth correlated casing property data is deployed at a different time than said electromagnetic transducer into the section of the borehole.

15. A system according to claim 14, wherein the compensation for attenuation further comprises calculation of a casing attenuation factor that is based at least in part a derivation of casing thickness and casing conductivity.

16. A system according to claim 15, wherein the calculation of the casing attenuation factor is based at least in part on a derivation of casing thickness, casing conductivity and relative magnetic permeability.

17. A system according to claim 14, wherein at least one of the other transducers using to measure the depth correlated casing property data is deployable at a different time than said electromagnetic transducer into the section of the borehole.

18. A system according to claim 14, wherein the processing system is further configured and arranged to perform an inversion based on the electromagnetic survey measurements, the inversion taking into account the compensation for attenuation due to the conductive casing.

19. A system according to claim 14, further comprising a second electromagnetic transducer deployable into a section of a second borehole, wherein the electromagnetic survey measurements are capable of being made by transmitting and receiving between the boreholes using the transducers.

20. A system according to claim 14, further comprising a second electromagnetic transducer located on the surface, wherein the electromagnetic survey measurements are capable of being made by transmitting and receiving between surface and the borehole using the transducers.

21. A system according to claim 14, further comprising a second electromagnetic transducer deployable into the section of the borehole, wherein the electromagnetic survey measurements are capable of being made by transmitting and receiving between the electromagnetic transducer and second electromagnetic transducer in the section of the borehole.

22. A system according to claim 14, wherein the electromagnetic transducer is permanently or semi-permanently installed in the section of the borehole.

23. A method for making an electromagnetic survey of a formation surrounding a borehole having a casing comprising:
   receiving electromagnetic survey measurements of the formation, the electromagnetic survey measurements made with an electromagnetic transducer deployed into a section of the borehole cased with a conductive casing;
   receiving a plurality of measurements of casing property data, the casing property data made with a casing property analysis tool at a plurality of depths deployed in the borehole, the casing property data representing one or more properties relating to the casing for the section of the borehole, the casing property analysis tool comprising at least one other transducer;
   correlating the casing property data according to a depth at which the casing property data was taken;
   directly calculating a casing factor based on the depth correlated casing property data;
   compensating for attenuation in the electromagnetic survey measurements with the directly calculated casing factor, and
   deriving, based on the depth correlated casing property data, one or more casing parameters selected from the group consisting of: casing thickness, casing conductivity, and relative magnetic permeability, wherein the deriving is performed independent of reference to the electromagnetic survey measurements; wherein at least one of the other transducers using to measure the depth correlated casing property data is deployed at a different time than said electromagnetic transducer into the section of the borehole.

24. A method according to claim 23, further comprising calculating a casing attenuation factor based at least in part on a derivation of casing thickness, casing conductivity and relative magnetic permeability.

25. A method according to claim 23, wherein the section of the borehole is cased with a non-magnetic casing.

26. A method according to claim 23, further comprising performing an inversion based on the electromagnetic survey measurements, the inversion taking into account the compensation for attenuation due to the conductive casing.

* * * * *